(12) United States Patent
Yamamoto et al.

(10) Patent No.: US 11,668,945 B2
(45) Date of Patent: Jun. 6, 2023

(54) HEAD-MOUNTED DISPLAY

(71) Applicant: PANASONIC INTELLECTUAL PROPERTY MANAGEMENT CO., LTD., Osaka (JP)

(72) Inventors: Yasutoshi Yamamoto, Osaka (JP); Toshihiro Sakatsume, Kanagawa (JP); Hiroyasu Makino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/269,782

(22) PCT Filed: Feb. 27, 2020

(86) PCT No.: PCT/JP2020/008121
§ 371 (c)(1),
(2) Date: Feb. 19, 2021

(87) PCT Pub. No.: WO2020/195521
PCT Pub. Date: Oct. 1, 2020

(65) Prior Publication Data
US 2021/0318545 A1    Oct. 14, 2021

(30) Foreign Application Priority Data

Mar. 27, 2019    (JP) .............................. JP2019-061678

(51) Int. Cl.
*G02B 27/00* (2006.01)
*G02B 27/01* (2006.01)

(52) U.S. Cl.
CPC .. *G02B 27/0176* (2013.01); *G02B 2027/0154* (2013.01)

(58) Field of Classification Search
CPC .................. G02B 27/0176; G02B 2027/0154
See application file for complete search history.

(56) References Cited

U.S. PATENT DOCUMENTS

2011/0077546 A1* 3/2011 Fabian ................... A61B 3/112
                                                              600/544
2016/0011423 A1* 1/2016 Thurber ............... G02B 27/017
                                                                 345/8

(Continued)

FOREIGN PATENT DOCUMENTS

CN          204331156 U        5/2015
CN          106125918 A       11/2016
(Continued)

OTHER PUBLICATIONS

International Search Report issued in International Patent Application No. PCT/JP2020/008121, dated May 26, 2020; with English translation.

(Continued)

*Primary Examiner* — Michael A Faragalla
(74) *Attorney, Agent, or Firm* — McDermott Will & Emery LLP

(57) ABSTRACT

The head mounted display includes: a headgear having an attachment that comes into close contact with the face of the user in a manner such that the user can see at least the front and a fixture that is attached to the attachment and is used for fixing the attachment to the head of the user while maintaining the close contact with the face of the user; a display unit that has a video display unit configured to display video and is detachable from the attachment; and a lock mechanism that is provided in at least one of the attachment or the display unit, and fixes the display unit to the attachment in a manner such that the fixing can be released. The attachment and the display unit are configured to engage with each other in the front-rear direction of the user.

6 Claims, 6 Drawing Sheets

(56) References Cited

U.S. PATENT DOCUMENTS

| | | | |
|---|---|---|---|
| 2016/0366399 A1* | 12/2016 | Tempel | H04N 13/344 |
| 2017/0115713 A1* | 4/2017 | Shin | G06F 1/1686 |
| 2018/0193730 A1* | 7/2018 | Oizumi | A63F 13/42 |
| 2018/0239151 A1 | 8/2018 | Chang et al. | |
| 2018/0352301 A1* | 12/2018 | Tofighbakhsh | H04N 21/252 |
| 2019/0025588 A1 | 1/2019 | Osterhout et al. | |
| 2019/0056597 A1* | 2/2019 | Kamiya | G02B 27/0172 |
| 2019/0227328 A1* | 7/2019 | Coatney | G06T 19/006 |
| 2020/0201048 A1 | 6/2020 | Nakata et al. | |

FOREIGN PATENT DOCUMENTS

| | | |
|---|---|---|
| JP | H07-250291 A | 9/1995 |
| JP | 2015-504616 A | 2/2015 |
| JP | 2019-036888 A | 3/2019 |
| JP | 2019-039988 A | 3/2019 |
| WO | 2013/049248 A2 | 4/2013 |
| WO | 2014/108693 A1 | 7/2014 |
| WO | 2018/053509 A1 | 3/2018 |

OTHER PUBLICATIONS

English translation of the International Preliminary Report on Patentability issued in International Application No. PCT/JP2020/008121, dated Oct. 7, 2021.
Extended European Search Report dated Apr. 20, 2022 issued in the corresponding European Patent Application No. 20777939.8.
Chinese Office Action with English translation of Search Report dated Feb. 28, 2023 issued in the corresponding Chinese Patent Application No. 202080004593.2.

* cited by examiner

HEAD-MOUNTED DISPLAY

CROSS-REFERENCE OF RELATED APPLICATIONS

This application is the U.S. National Phase under 35 U.S.C. § 371 of International Patent Application No. PCT/JP2020/008121, filed on Feb. 27, 2020, which in turn claims the benefit of Japanese Application No. 2019-061678, filed on Mar. 27, 2019, the entire disclosures of which Applications are incorporated by reference herein.

TECHNICAL FIELD

The present disclosure relates to a head mounted display.

BACKGROUND ART

As described in Patent Document 1, for example, a head mounted display that provides a user with video related to virtual reality (VR) or augmented reality (AR) is known. The head mounted display is worn on the head of the user so as to cover the eyes of the user, and provides the user with video related to virtual reality or augmented reality via a video display unit disposed in front of the eyes of the user.

PRIOR ART DOCUMENTS

Patent Documents

Patent Document 1: JP 2019-39988 A

SUMMARY OF THE INVENTION

Problems to be Solved by the Invention

By the way, in recent years, it has been desired to provide users (customers) with attractions that use head mounted displays in amusement facilities such as theme parks. However, since an unspecified large number of users use one head mounted display, the operator of the amusement facility needs to clean the head mounted display, especially a part that comes into contact with the head of the user. Moreover, depending on the user, it may take time to wear the head mounted display. As a result, the operating rate of the head mounted display decreases.

Therefore, an object of the present disclosure is to increase the operating rate of a head mounted display to be used by an unspecified large number of users.

Means for Solving the Problems

An aspect of the present disclosure provides a head mounted display including:
a headgear having an attachment that comes into close contact with the face of the user in a manner such that the user can see at least the front and a fixture that is attached to the attachment and is used for fixing the attachment to the head of the user while maintaining the close contact with the face of the user;
a display unit that has a video display unit configured to display video and is detachable from the attachment; and
a lock mechanism that is provided in at least one of the attachment or the display unit, and fixes the display unit to the attachment in a manner such that the fixing can be released,
in which the attachment and the display unit are configured to engage with each other in a front-rear direction of the user.

Effects of the Invention

It is possible with the present disclosure to increase the operating rate of a head mounted display to be used by an unspecified large number of users.

MODE(S) FOR CARRYING OUT THE INVENTION

Hereinafter, embodiments will be described in detail with reference to appropriate figures. However, more detailed description than necessary may be omitted. For example, detailed description of already well-known matters or redundant description of substantially the same configurations may be omitted. This is to avoid unnecessary redundancy in the following description and to facilitate understanding by those skilled in the art.

It is to be noted that the inventor(s) provides the accompanying drawings and the following description to allow those skilled in the art to fully understand the present disclosure, and the accompanying drawings and the following description are not intended to limit the subject matter described in the claims.

A head mounted display according to an embodiment of the present disclosure will be described below with reference to FIGS. 1 to 6.

Figure 1:
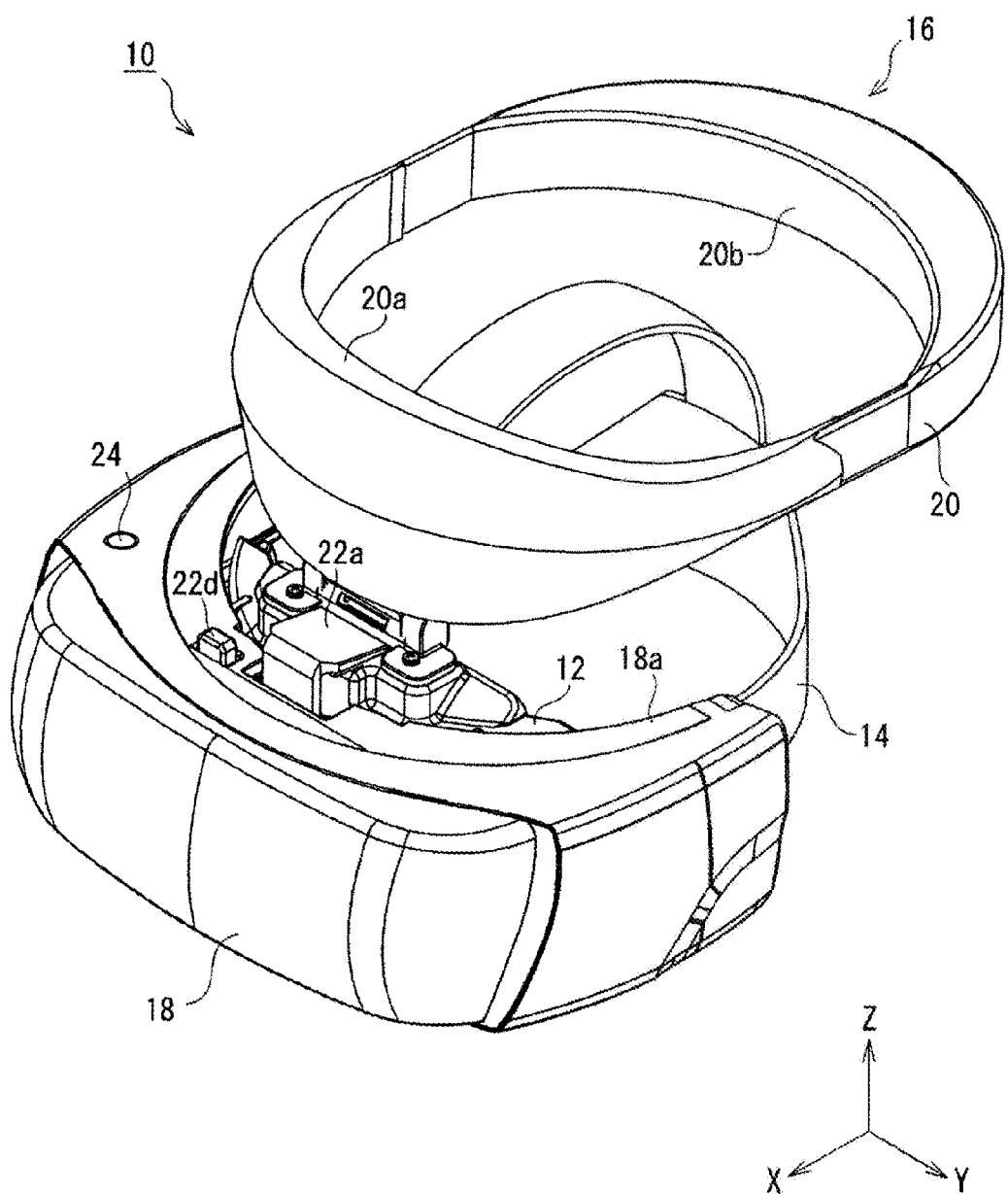
FIG. 1 is a perspective view of a head mounted display according to an embodiment of the present disclosure.
Figure 2:
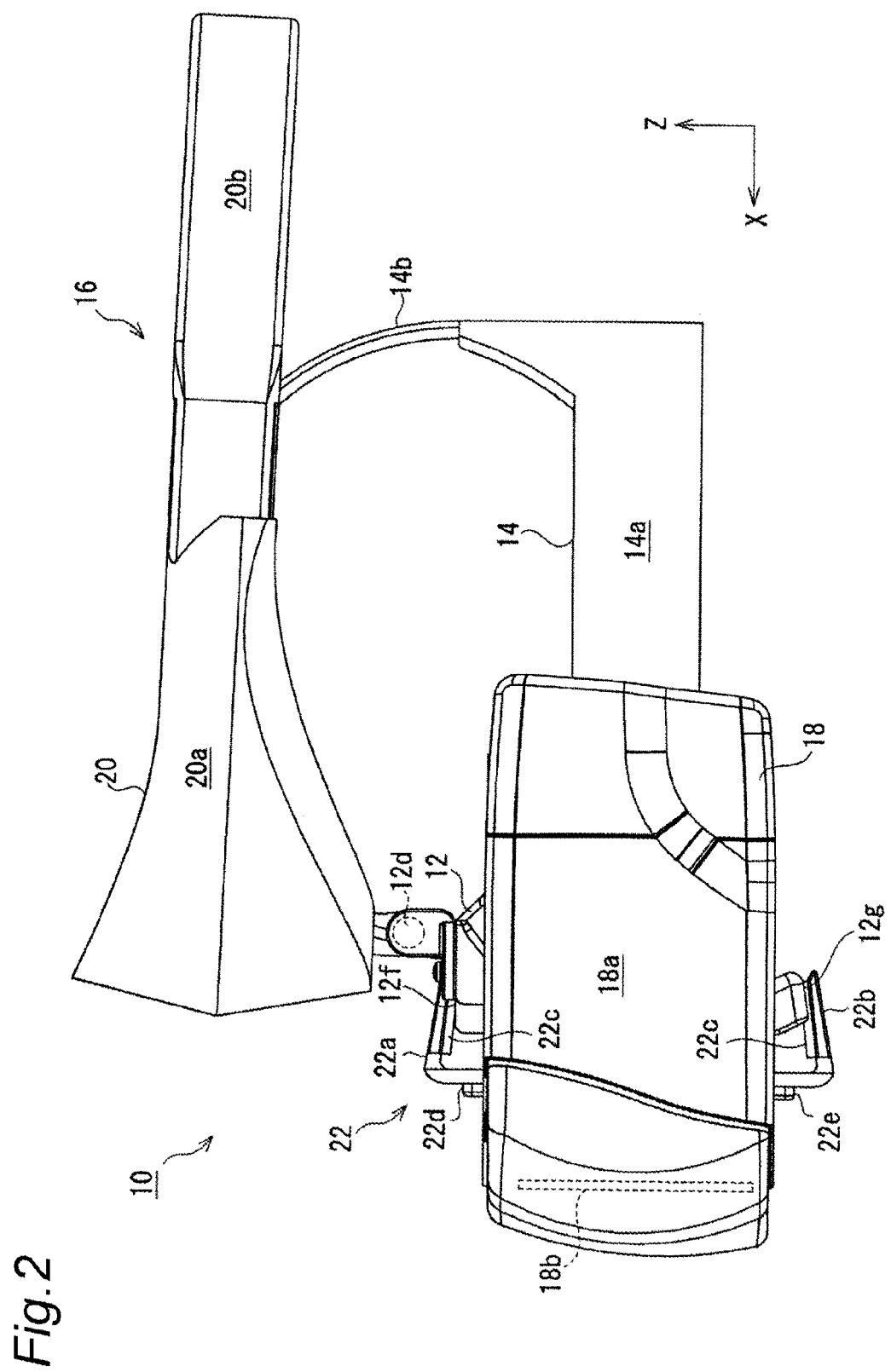
FIG. 2 is a side view of a head mounted display.
Figure 3:
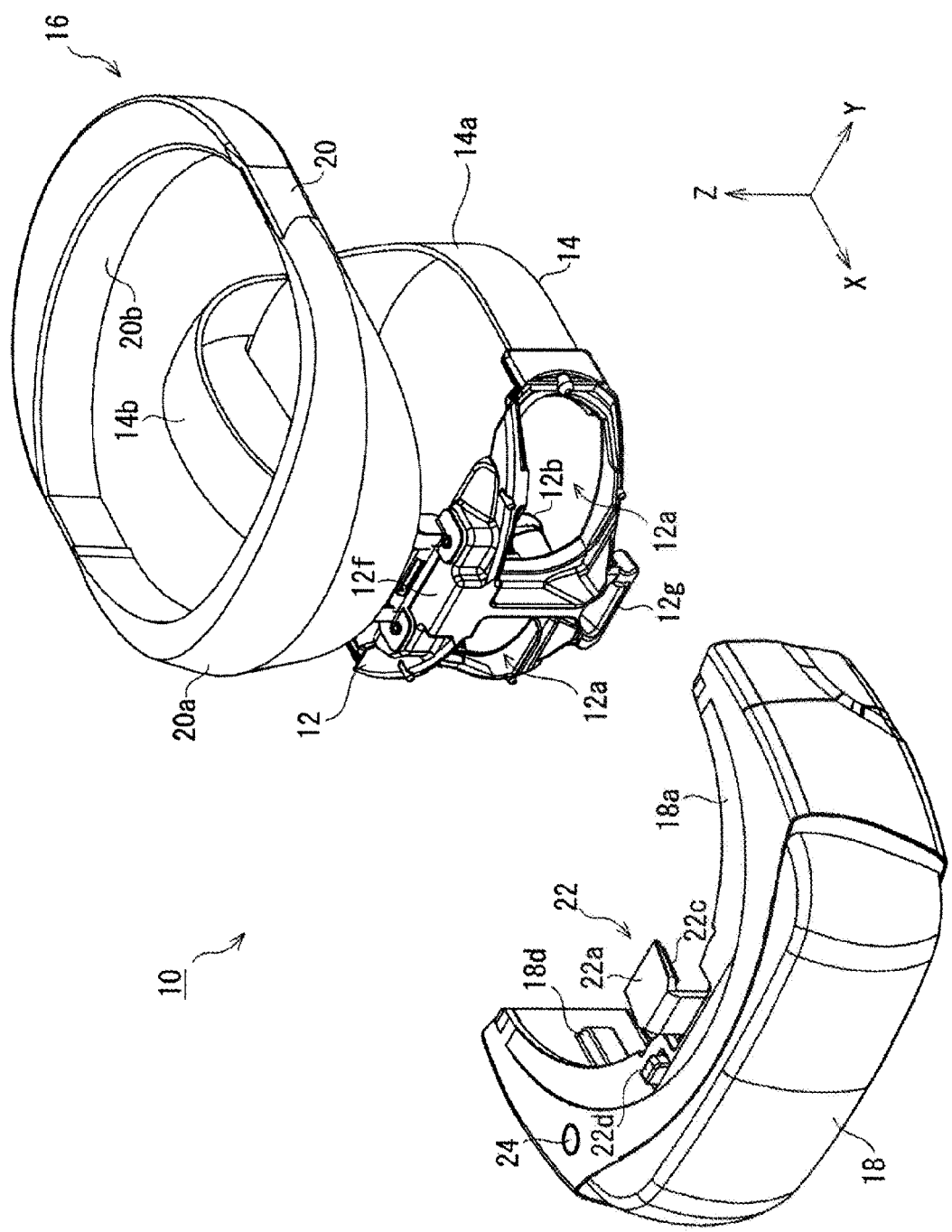
FIG. 3 is an exploded perspective view of a head mounted display with a display unit separated.

FIG. 1 is a perspective view illustrating a head mounted display according to an embodiment of the present disclosure. Moreover, FIG. 2 is a side view of the head mounted display. Moreover, FIG. 3 is an exploded perspective view of the head mounted display. It is to be noted that the X-Y-Z coordinate system illustrated in the figures is to facilitate understanding of the embodiment, and does not limit the embodiment. In the X-Y-Z coordinate system, the X-axis direction is the front-rear direction of the user who wears and uses the head mounted display, the Y-axis direction is a right-left direction, and the Z-axis direction is an up-down direction.

As illustrated in FIGS. 1 to 3, a head mounted display 10 generally includes: a headgear 16 having an attachment 12 that comes into close contact with the face of the user and a fixture 14 to be used for fixing the attachment 12 to the head of the user; and a display unit 18 that is detachable from the attachment 12 of the headgear 16.

The attachment 12 of the headgear 16 functions as a bracket to be used for attaching the display unit 18 to the head of the user.

Figure 4:
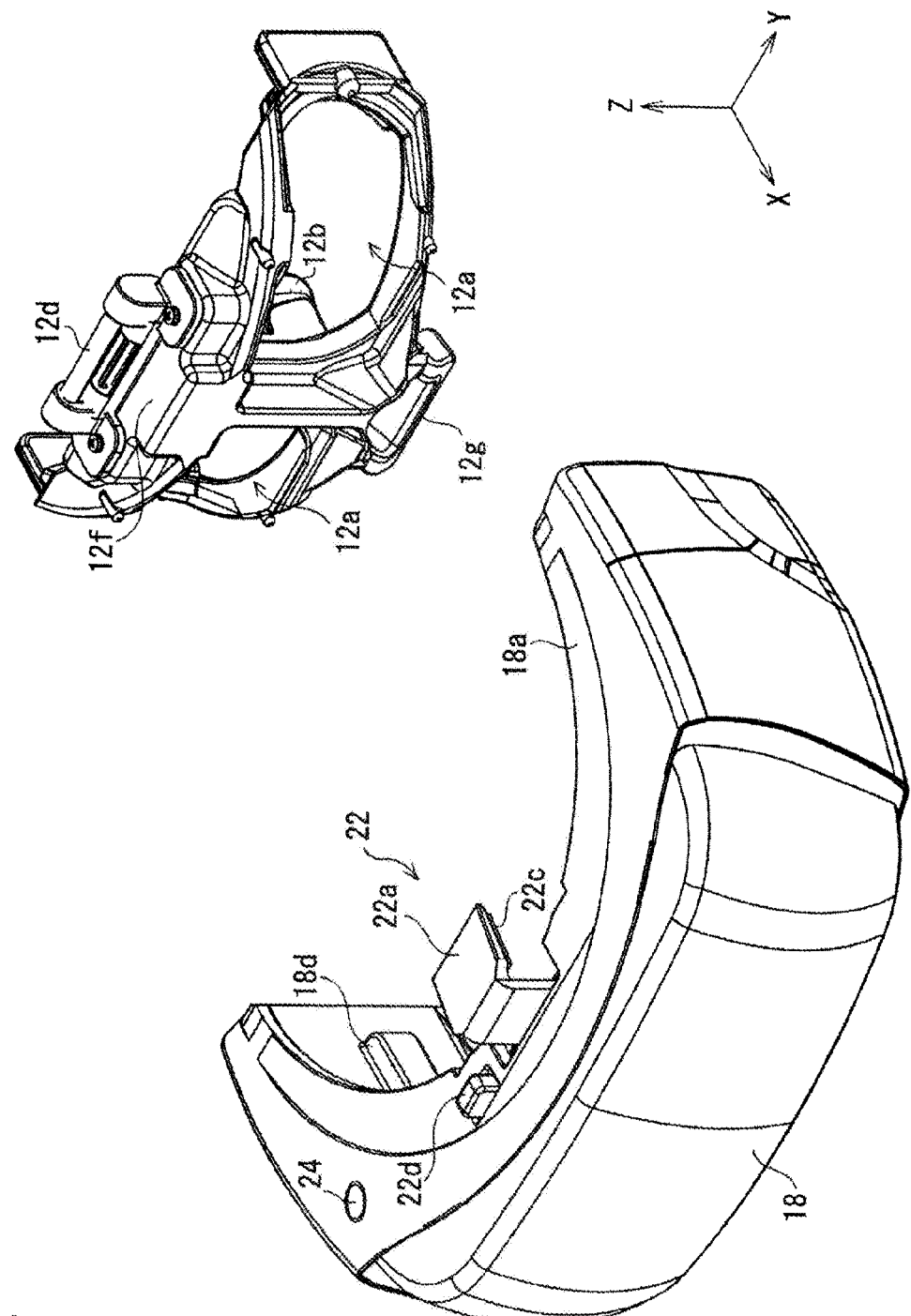
FIG. 4 is a perspective view of a display unit and an attachment.
Figure 5:
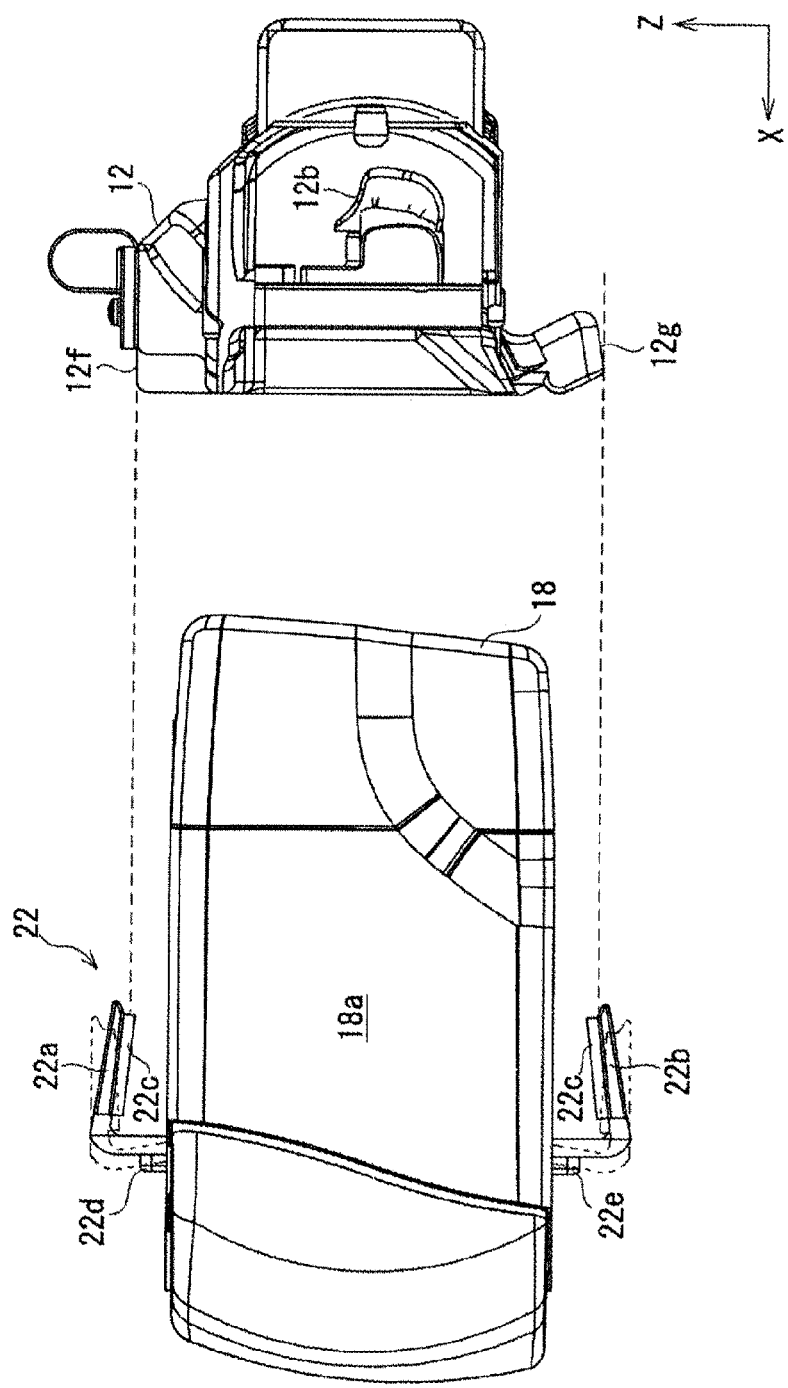
FIG. 5 is a side view of a display unit and an attachment.

FIG. 4 is a perspective view of the display unit and the attachment. Moreover, FIG. 5 is a side view of the display unit and the attachment. In addition, FIG. 6 is a top view of the display unit and the attachment.

Figure 6:
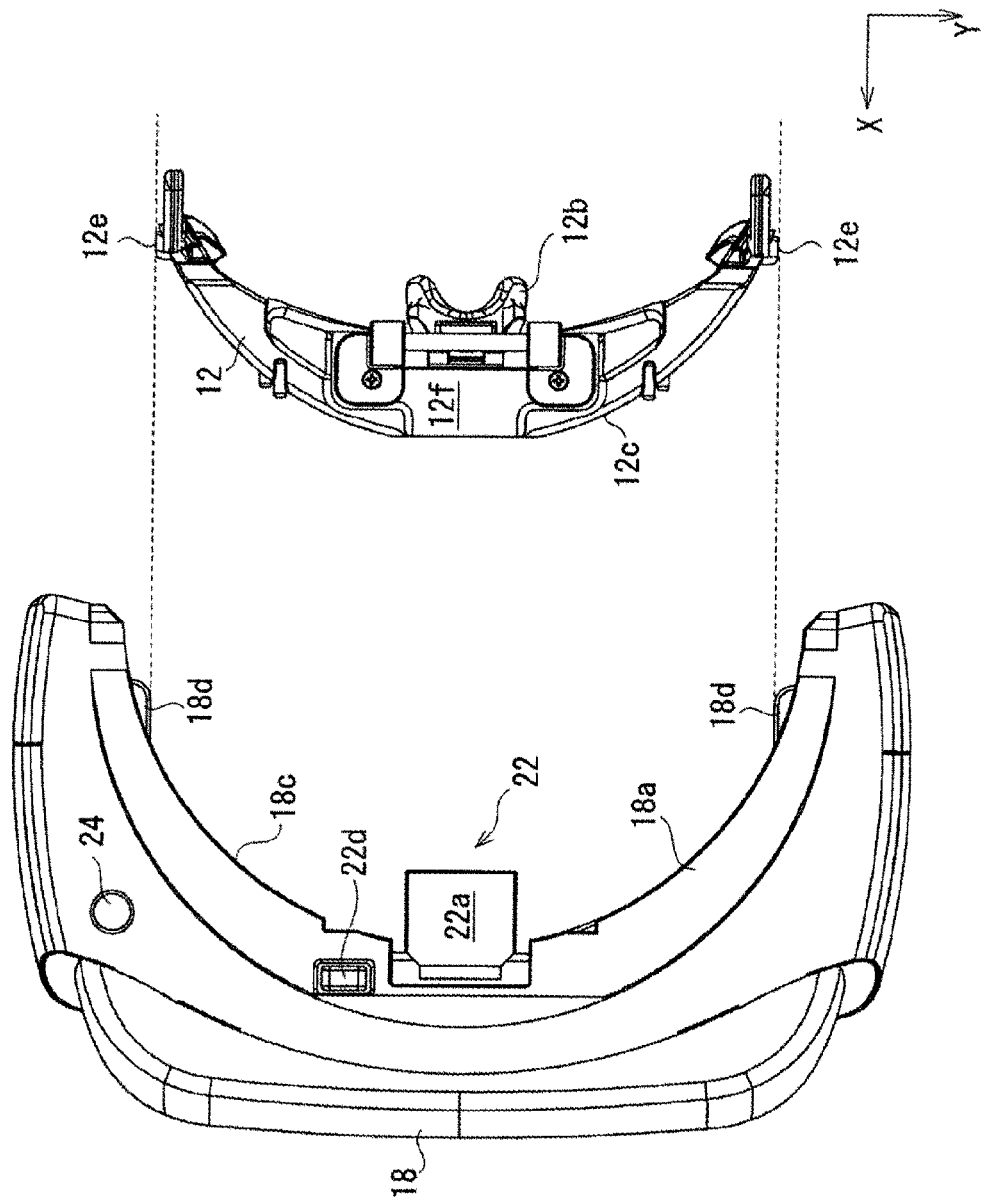
FIG. 6 is a top view of a display unit and an attachment.

As illustrated in FIGS. 4 to 6, the attachment 12 of the headgear 16 is a device that comes into close contact with the face of the user, particularly the periphery of the eyes, in a manner such that the user can see at least the front. In the case of the present embodiment, the attachment 12 is in the shape of goggles in which a through hole 12a is formed in front of each of the eyes of the user. Moreover, the attachment 12 is prepared from a cleanable material for a reason described later. Furthermore, in the case of the present embodiment, the attachment 12 includes a nose pad 12b to be placed on the nose of the user in order to achieve positioning with respect to the face of the user. The nose pad 12b positions the attachment 12 with respect to the face of the user in the right-left direction (Y-axis direction) and the up-down direction (Z-axis direction).

Moreover, in the case of the present embodiment, the attachment 12 includes, on the front side, a convex portion 12c that curves convexly toward the front of the user as viewed in the up-down direction (Z-axis direction) of the user as illustrated in FIG. 6. In the case of the present embodiment, the convex portion 12c of the attachment 12 has an arc shape. The reason of providing such a convex portion will be described later.

As illustrated in FIG. 3, the fixture 14 of the headgear 16 is a device that is attached to the attachment 12 and is used for fixing the attachment 12 to the head of the user while maintaining the close contact with the face of the user. In the case of the present embodiment, the fixture 14 is composed of a first stretchable belt 14a that extends from one end toward the other end in the right-left direction (Y-axis direction) of the attachment 12, and a second stretchable belt 14b that extends from an upper end of the attachment 12 toward a central part of the first belt 14a. The fixture 14 is also prepared from a cleanable material as with the attachment 12 for a reason described later. With such a fixture 14, the attachment 12 is fixed to the head of the user in close contact with the face of the user.

In a case where the head mounted display 10 is used for an attraction in which the head of the user repeatedly moves up and down, for example, in a case where the head mounted display 10 is worn by a user who gets on a moving casing such as a roller coaster, it is to be noted that the headgear 16 of the head mounted display 10 preferably includes a head pad unit 20 as in the present embodiment.

The head pad unit 20 includes a front pad 20a that abuts on the forehead of the user and a rear pad 20b that abuts on the occipital region of the user, and the rear pad 20b is configured to be able to get close to and away from the front pad 20a. Moreover, the front pad 20a is attached to the attachment 12 so as to be rotatable. Specifically, as illustrated in FIG. 4, the head pad unit 20 is attached so as to be rotatable with respect to a support shaft 12d that is provided at the attachment 12 and extends in the right-left direction (Y-axis direction). Since the front pad 20a and the rear pad 20b sandwich the head of the user in the front-rear direction, the attachment 12 with the display unit 18 attached is suppressed from being displaced during the attraction. The head pad unit 20 is also prepared from a cleanable material as with the attachment 12 and the fixture 14.

The display unit 18 is substantially a main body of the head mounted display 10, and includes a casing 18a that is detachable from the attachment 12 of the headgear 16. Moreover, as illustrated in FIG. 2, the display unit 18 has, in the casing 18a, a video display unit 18b such as a liquid crystal display that displays video. Moreover, the display unit 18 includes a lens (not shown) to be disposed between the video display unit 18b and the attachment 12. When the display unit 18 is attached to the attachment 12, the lens and the video display unit 18b are disposed in front of the eyes of the user wearing the attachment 12. This provides the user with video displayed on the video display unit 18b via the lens.

Moreover, in the case of the present embodiment, the casing 18a of the display unit 18 has a concave portion 18c that engages with the convex portion 12c of the attachment 12 on the rear side, that is, on the side of the attachment 12c as viewed in the up-down direction (Z-axis direction) of the user as illustrated in FIG. 6.

Since the rear end of the display unit 18 includes the concave portion 18c that engages with the convex portion 12c at the front end of the attachment 12, the attachment/detachment direction of the display unit 18 to/from the attachment 12, that is, the engagement direction is limited to the front-rear direction of the user. That is, the display cannot be attached to or detached from the attachment 12 in the right-left direction of the user. The reason of limiting the attachment/detachment direction of the display unit 18 to/from the attachment 12 to the front-rear direction of the user as described above and the effect thereof will be described later.

Furthermore, in the case of the present embodiment, the display unit 18 includes a pair of side guide portions 18d that guide the display unit 18 itself in the front-rear direction (X-axis direction) of the user when the display unit 18 is attached to and detached from the attachment 12 as illustrated in FIG. 6. Specifically, the pair of side guide portions 18d are disposed at both ends of the concave portion 18c of the display unit 18. By facing each of the end portions 12e of the attachment 12 in the right-left direction (Y-axis direction), the pair of side guide portions 18d guide the display unit 18 in the front-rear direction while positioning the display unit 18 with respect to the attachment 12 in the right-left direction. While the display unit 18 is attached to the attachment 12, the attachment 12 exists between the pair of side guide portions 18d. Such a pair of side guide portions 18d also limit the attachment/detachment direction of the display unit 18 to/from the attachment 12 to the front-rear direction of the user.

As illustrated in FIG. 5, the head mounted display 10 has a lock mechanism 22 that fixes the display unit 18 to the attachment 12 in a manner such that the fixing can be released. In the case of the present embodiment, the lock mechanism 22 is provided at a central part of the display unit 18 in the right-left direction (Y-axis direction).

Moreover, in the case of the present embodiment, the lock mechanism 22 includes a pair of clamp arms 22a and 22b that sandwich the attachment 12 in the up-down direction (Z-axis direction) of the user. Specifically, one clamp arm 22a is provided at an upper portion of the display unit 18, and the other clamp arm 22b is provided at a lower portion of the display unit 18. Moreover, each of the clamp arms 22a and 22b includes a slip stopper pad 22c that has a tip configured to come into contact with the display unit 18 and is prepared from an elastic material such as rubber, for example.

The clamp arms 22a and 22b of the lock mechanism 22 are each biased by a biasing member such as a spring (not shown) so that the attachment 12 is sandwiched in the up-down direction (Z-axis direction), that is, the tips (i.e., slip stopper pads 22c) of the clamp arms get close to each other. Moreover, the display unit 18 is provided with unlock buttons 22d and 22e to be used for turning the clamp arms 22a and 22b so that the tips of the clamp arms 22a and 22b are separated from each other (two-dot chain line) against the biasing. Pressing the unlock button 22*d* turns one clamp arm 22*a* to tilt forward, and pressing the unlock button 22*e* turns the other clamp arm 22*b* to tilt forward, so that the tips of the clamp arms move away from each other.

The attachment 12 is provided with an upper contact surface 12*f* and a lower contact surface 12*g* that come into surface contact with the tips (i.e., slip stopper pads 22*c*) of the clamp arms 22*a* and 22*b*. The upper contact surface 12*f* and the lower contact surface 12*g* are provided on opposite sides from each other in the up-down direction (Z-axis direction). Moreover, the upper contact surface 12*f* and the lower contact surface 12*g* are not parallel to each other, and one is tilted with respect to the other so that a plane including the upper contact surface 12*f* and a plane including the lower contact surface 12*g* intersect with each other in front of the attachment 12.

Now, a method of fixing the display unit 18 to the attachment 12 using such a lock mechanism 22 will be described. First, the display unit 18 is moved toward the attachment 12 in the front-rear direction (X-axis direction) of the user. This pushes the attachment 12 into between the tips of the pair of clamp arms 22*a* and 22*b* of the lock mechanism 22. When the display unit 18 is further brought closer to the attachment 12, the display unit 18 comes into contact with the attachment 12, and moreover, the attachment 12 is sandwiched by the pair of clamp arms 22*a* and 22*b* in the front-rear direction (Z-axis direction). As a result, the display unit 18 is fixed to the attachment 12.

When the unlock buttons 22*d* and 22*e* are pressed in a state in which the display unit 18 is fixed to the attachment 12, the pair of clamp arms 22*a* and 22*b* can release the attachment 12, so that the display unit 18 can be detached from the attachment 12.

Since the clamp arms 22*a* and 22*b* of the lock mechanism 22 sandwich the attachment 12 in the up-down direction (Z-axis direction) of the user as described above, the display unit 18 can be firmly fixed to the attachment 12 fixed to the head of the user that repeatedly moves up and down during the attraction. That is, the display unit 18 is suppressed from moving up and down with respect to the attachment 12.

Moreover, since the upper contact surface 12*f* and the lower contact surface 12*g* of the attachment 12 are inclined with respect to each other as illustrated in FIG. 5, the display unit 18 fixed to the attachment 12 via the lock mechanism 22 is suppressed from falling to the front of the attachment 12.

Furthermore, in the case of the present embodiment, the head mounted display 10 has a notification unit 24 that gives notification of completion of fixing the display unit 18 to the attachment 12 by the lock mechanism 22.

Specifically, in the case of the present embodiment, the head mounted display 10 has a light emitting unit 24 such as an LED provided on an upper surface of the display unit 18 as the notification unit 24.

The light emitting unit 24 emits, for example, green light when the fixing of the display unit 18 to the attachment 12 by the lock mechanism 22 is completed. This notifies a third party other than the user wearing the head mounted display 10, for example, an operator of the attraction that uses the head mounted display 10, of the completion of fixing the display unit 18. As a result, the operator can start the attraction for the user wearing the head mounted display 10.

It is to be noted that the completion of fixing the display unit 18 to the attachment 12 may be detected, for example, by pressing a detection switch of the display unit 18 with a protrusion projecting forward from the attachment 12. Moreover, for example, an integrated circuit (IC) and a plurality of contact electrodes connected to the IC are provided in the attachment 12, and a plurality of terminals that come into contact with the plurality of contact electrodes are provided in the display unit 18. The display unit 18 may transmit a signal via a terminal and receive a signal corresponding to the signal from the IC so as to detect the completion of fixing the display unit 18 to the attachment 12. This completion of fixing is variously changed according to the usage pattern of the head mounted display 10.

Moreover, the light emission of the light emitting unit 24 is invisible to the user because the light emission is to notify a third party other than the user wearing the head mounted display 10 of the completion of fixing the display unit 18 to the attachment 12. The user may be notified of the completion of fixing the display unit 18 via the video display unit 18*b* of the display unit 18.

It is possible with the present embodiment described above to increase the operating rate of a head mounted display to be used by an unspecified large number of users.

A concrete description on this will now be given.

First, as described above and as illustrated in FIG. 3, the display unit 18 that is substantially a main body of the head mounted display 10, and the headgear 16 (attachment 12, fixture 14, and head pad unit 20) that is a part of the head mounted display 10 to come into contact with the user are separable from each other.

Accordingly, if a plurality of headgears 16 are prepared for one display unit 18, the display unit 18, that is, the head mounted display 10 can be continuously used by using some headgears 16 while other headgears 16 are cleaned.

Moreover, it is possible to allow many users waiting for an attraction that uses the head mounted display 10 to wear a headgear 16 previously. Then, the display unit 18 can be attached to the attachment 12 of the headgear 16 worn by a user who is going to experience the attraction. For example, a user wearing a headgear 16 gets on an attraction vehicle, and the display unit 18 connected to the vehicle via a signal line can be attached to the attachment 12 of the user who has got on the vehicle.

In this case, the time required for the user to wear the head mounted display 10 is shortened.

In contrast to the present embodiment, in the case of a head mounted display in which a display unit is undetachable, it is difficult for the user to check whether the head mounted display is normally worn or not, since the head mounted display covers the eyes of the user. Therefore, in some cases, the operator needs to make the check. Moreover, it may be necessary for the operator to assist some users in wearing the head mounted display. On the other hand, in the case of the present embodiment, the user can normally and easily wear the headgear 16 while checking with the eyes of the user and, in some cases, by using a mirror.

Furthermore, as described above and as illustrated in FIG. 6, the attachment 12 and the display unit 18 are configured to engage with each other in the front-rear direction (X-axis direction) of the user. This allows the user wearing the headgear 16 to easily attach the display unit 18 to the attachment 12 by disposing the display unit 18 in front and bringing the display unit 18 closer to the face of the user. In contrast, in a case where the display unit 18 engages with the attachment 12 in the right-left direction (Y-axis direction) or the up-down direction (Z-axis direction) of the user, the user needs to move the display unit 18 outside the field of view toward the attachment 12.

For the above reason, it is possible with the present embodiment to increase the operating rate of a head mounted display to be used by an unspecified large number of users.

Furthermore, in the case of the present embodiment, since the attachment 12 of the headgear 16 is in the shape of goggles, the user can intuitively position the attachment 12 with respect to the face of the user in a short time without worrying about how to wear the attachment. As a result, the wearing time of the head mounted display 10 is shortened, which increases the operating rate.

In addition, in the case of the present embodiment, the light emitting unit 24 gives notification of the completion of fixing the display unit 18 to the attachment 12. Accordingly, the operator can check the completion of fixing the display unit 18 to each of the plurality of users in a short time. This allows the operator to start the attraction immediately, which increases the operating rate of a head mounted display.

Although the present disclosure has been described above with reference to the above-described embodiments, embodiments of the present disclosure are not limited thereto.

For example, in the case of the above-described embodiment, fixing of the display unit 18 to the attachment 12 is achieved by the pair of clamp arms 22a and 22b of the lock mechanism 22 sandwiching the attachment 12 as illustrated in FIG. 2. However, fixing the display unit to the attachment is not limited to this. As the lock mechanism, for example, the attachment may include a metal portion, and an electromagnet magnetically connected to the metal portion may be provided in the display unit. In this case, the display unit can be fixed to the attachment when the operator of the attraction turns on electricity of the electromagnet or when electricity of the electromagnet is automatically turned on immediately before the start of the attraction.

Moreover, in the case of the above-described embodiment, the lock mechanism 22 is provided in the display unit 18 as illustrated in FIG. 3. Alternatively, a lock mechanism may be provided in the attachment of the headgear.

Furthermore, in the case of the above-described embodiment, the light emission of the light emitting unit 24 gives notification of the completion of fixing the display unit 18 to the attachment 12. However, notification of the completion of fixing is not limited to this. For example, the display unit 18 may transmit a fixing completion signal to a manual operating device of the attraction to be used by the operator to execute the start of the attraction.

Finally, engagement between the attachment 12 and the display unit 18 in the front-rear direction (X-axis direction) of the user means engagement necessary for relatively moving the display unit 18 in the front-rear direction toward the attachment 12 so that the head mounted display 10 is brought into a final usable form. Accordingly, a case where the attachment 12 and the display unit 18 do not come into contact with each other in the front-rear direction is also included. For example, a case where an engagement pin that is provided in one of the attachment or the display and extends in the front-rear direction of the user, and an engagement hole that is provided in the other and penetrates in the front-rear direction engage with each other is also included.

That is, in a broad sense, a head mounted display according to an embodiment of the present disclosure includes: a headgear having an attachment that comes into close contact with the face of the user in a manner such that the user can see at least the front and a fixture that is attached to the attachment and is used for fixing the attachment to the head of the user while maintaining the close contact with the face of the user; a display unit that has a video display unit configured to display video and is detachable from the attachment; and a lock mechanism that is provided in at least one of the attachment or the display unit, and fixes the display unit to the attachment in a manner such that the fixing can be released, in which the attachment and the display unit are configured to engage with each other in the front-rear direction of the user.

As described above, a plurality of embodiments have been described as illustrations of the technique in the present disclosure. The accompanying drawings and the detailed description are provided for that purpose.

Accordingly, components described in the accompanying drawings and the detailed description may include not only components essential for solving the problems, but also components not essential for solving the problems in order to illustrate the above technique. Therefore, it should not be immediately recognized that these non-essential components are essential even though those non-essential components are described in the accompanying drawings or the detailed description.

Moreover, since the above-described embodiments are for illustrating the technique in the present disclosure, various changes, substitutions, additions, omissions, or the like can be made in claims or equivalent scope thereof.

INDUSTRIAL APPLICABILITY

The present disclosure is applicable to a head mounted display.

The invention claimed is:

1. A head mounted display comprising:
   a headgear having an attachment that comes into close contact with a face of a user in a manner such that the user can see at least a front and a fixture that is attached to the attachment and is used for fixing the attachment to a head of the user while maintaining close contact with the face of the user;
   a display unit that has a video display unit configured to display video and is detachable from the attachment;
   a lock mechanism that is provided in at least one of the attachment or the display unit, and fixes the display unit to the attachment in a manner such that fixing can be released; and
   a notification unit that provides notification of completion of fixing the display unit to the attachment by the lock mechanism,
   wherein the attachment and the display unit are configured to engage with each other in a front-rear direction of the user,
   wherein the notification unit is positioned on the display unit such that the notification unit is invisible to the user wearing the head mounted display and notifies a third party other than the user wearing the head mounted display, and
   wherein the notification unit is a light emitting unit emitting light indicating the completion of fixing the display unit to the attachment by the lock mechanism.

2. The head mounted display according to claim 1, wherein
   the attachment has, on a front side, a convex portion that curves convexly toward a front of the user as viewed in an up-down direction of the user, and
   the display unit has, on a rear side, a concave portion that engages with the convex portion of the attachment as viewed in the up-down direction.

3. The head mounted display according to claim 1, wherein the display unit includes a pair of side guide portions that face each of ends of the attachment in a right-left direction and guide the display unit in a front-rear direction of the user when the display unit is attached to and detached from the attachment.

4. The head mounted display according to claim 1, wherein the lock mechanism includes a pair of clamp arms that sandwich the attachment in an up-down direction of the user.

5. The head mounted display according to claim 1, wherein the lock mechanism includes:
   a metal portion provided in the attachment; and
   an electromagnet that is provided in the display unit and is magnetically connected to the metal portion.

6. The head mounted display according to claim 1, wherein the attachment is in a shape of goggles.

\* \* \* \* \*